(12) United States Patent
Chunduru et al.

(10) Patent No.: US 12,499,611 B1
(45) Date of Patent: Dec. 16, 2025

(54) SYSTEM AND METHOD FOR GENERATING CANONICAL VIEWS FOR VOLUMETRIC IMAGING DATA

(71) Applicant: Anumana, Inc., Cambridge, MA (US)

(72) Inventors: Abhijith Chunduru, Bengaluru (IN); Animesh Agarwal, San Mateo, CA (US); Suthirth Vaidya Subramany, Bengaluru (IN); Rakesh Barve, Bengaluru (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 19/253,562

(22) Filed: Jun. 27, 2025

(51) Int. Cl.
| | |
|---|---|
| *G06T 15/20* | (2011.01) |
| *A61B 6/46* | (2024.01) |
| *G06T 7/11* | (2017.01) |
| *G06T 15/08* | (2011.01) |
| *G16H 30/40* | (2018.01) |

(52) U.S. Cl.
CPC .............. *G06T 15/20* (2013.01); *A61B 6/466* (2013.01); *A61B 6/469* (2013.01); *G06T 7/11* (2017.01); *G06T 15/08* (2013.01); *G16H 30/40* (2018.01); *G06T 2200/24* (2013.01); *G06T 2207/10081* (2013.01); *G06T 2207/20081* (2013.01); *G06T 2207/30004* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 7,355,605 B2 | 4/2008 | Cathier | |
| 7,715,627 B2 | 5/2010 | Sun et al. | |
| 9,020,235 B2 | 4/2015 | Krishnan et al. | |
| 11,288,812 B2 | 3/2022 | Soler et al. | |
| 11,436,801 B2 | 9/2022 | Haslam et al. | |
| 11,842,498 B2 | 12/2023 | Laaksonen et al. | |
| 2015/0154282 A1* | 6/2015 | Watanabe | G06F 16/2264 707/743 |
| 2019/0172270 A1* | 6/2019 | Sudre | G16H 50/50 |
| 2025/0177727 A1* | 6/2025 | Lunze | A61M 60/867 |

\* cited by examiner

*Primary Examiner* — Frank S Chen
(74) *Attorney, Agent, or Firm* — Caldwell Intellectual Property Law

(57) ABSTRACT

A system and method for generating canonical views for volumetric imaging data are disclosed. The system includes at least a processor and a memory communicatively connected to the at least a processor, wherein the memory contains instructions configuring the at least a processor to receive volumetric imaging data, segment the at least one organ structure of the volumetric imaging data into a plurality of organ components, compute, for each organ component, one or more eigenvectors and corresponding eigenvalues, divide each organ component into a plurality of three-dimensional octants, receive a user input, wherein the user input includes a selection of a reference field of view, determine which of the plurality of three-dimensional octants are intersected by the reference field of view and output the volumetric imaging data with the canonical view.

20 Claims, 7 Drawing Sheets

SYSTEM AND METHOD FOR GENERATING CANONICAL VIEWS FOR VOLUMETRIC IMAGING DATA

FIELD OF THE INVENTION

The present invention generally relates to the field of medical imaging. In particular, the present invention is directed to a system and method for generating canonical views for volumetric imaging data.

BACKGROUND

In the field of medical imaging, particularly in the analysis of organ structures, various approaches have been developed to enhance the visualization and interpretation of volumetric imaging data. Traditional methods often involve manual segmentation of organ structures, which can be time-consuming and prone to variability due to the subjective nature of human interpretation. These methods typically rely on the expertise of clinicians to identify and delineate organ components, which can lead to inconsistencies in the resulting images and interpretations. None of existing approaches have provided a comprehensive solution.

SUMMARY OF THE DISCLOSURE

In some aspects, the techniques described herein relate to a system for generating canonical views for volumetric imaging data, the system including: at least a processor; and a memory communicatively connected to the at least a processor, wherein the memory contains instructions configuring the at least a processor to: receive volumetric imaging data representing at least one organ structure; segment the at least one organ structure of the volumetric imaging data into a plurality of organ components; compute, for each organ component of the plurality of organ components, one or more eigenvectors and corresponding eigenvalues, wherein the one or more eigenvectors define a component-specific spatial coordinate system; divide each organ component into a plurality of three-dimensional octants as a function of the one or more eigenvectors; receive a user input, wherein the user input includes a selection of a reference field of view from the volumetric imaging data; determine which of the plurality of three-dimensional octants are intersected by the reference field of view, wherein determining which of the plurality of three-dimensional octants are intersected by the reference field of view includes storing a mapping of the intersected three-dimensional octants as a canonical view; and output the volumetric imaging data with the canonical view.

In some aspects, the techniques described herein relate to a method for generating canonical views for volumetric imaging data, the method including: receiving, using at least a processor, volumetric imaging data representing at least one organ structure; segmenting, using the at least a processor, the at least one organ structure of the volumetric imaging data into a plurality of organ components; computing, using the at least a processor and for each organ component of the plurality of organ components, one or more eigenvectors and corresponding eigenvalues, wherein the one or more eigenvectors define a component-specific spatial coordinate method; dividing, using the at least a processor, each organ component into a plurality of three-dimensional octants as a function of the one or more eigenvectors; receiving, using the at least a processor, a user input, wherein the user input includes a selection of a reference field of view from the volumetric imaging data; determining, using the at least a processor, which of the plurality of three-dimensional octants are intersected by the reference field of view, wherein determining which of the plurality of three-dimensional octants are intersected by the reference field of view includes storing a mapping of the intersected three-dimensional octants as a canonical view; and outputting, using the at least a processor, the volumetric imaging data with the canonical view.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating canonical views for volumetric imaging data, the system including: at least a processor; and a memory communicatively connected to the at least a processor, wherein the memory contains instructions configuring the at least a processor to: receive volumetric imaging data representing at least one organ structure; segment the at least one organ structure of the volumetric imaging data into a plurality of organ components; compute, for each organ component of the plurality of organ components, one or more eigenvectors and corresponding eigenvalues, wherein the one or more eigenvectors define a component-specific spatial coordinate system; divide each organ component into a plurality of three-dimensional octants as a function of the one or more eigenvectors; receive a user input, wherein the user input includes a selection of a reference field of view from the volumetric imaging data; determine which of the plurality of three-dimensional octants are intersected by the reference field of view, wherein determining which of the plurality of three-dimensional octants are intersected by the reference field of view includes storing a mapping of the intersected three-dimensional octants as a canonical view; and output the volumetric imaging data with the canonical view. Exemplary embodiments illustrating aspects of the present disclosure are described below in the context of several specific examples.

Figure 1:
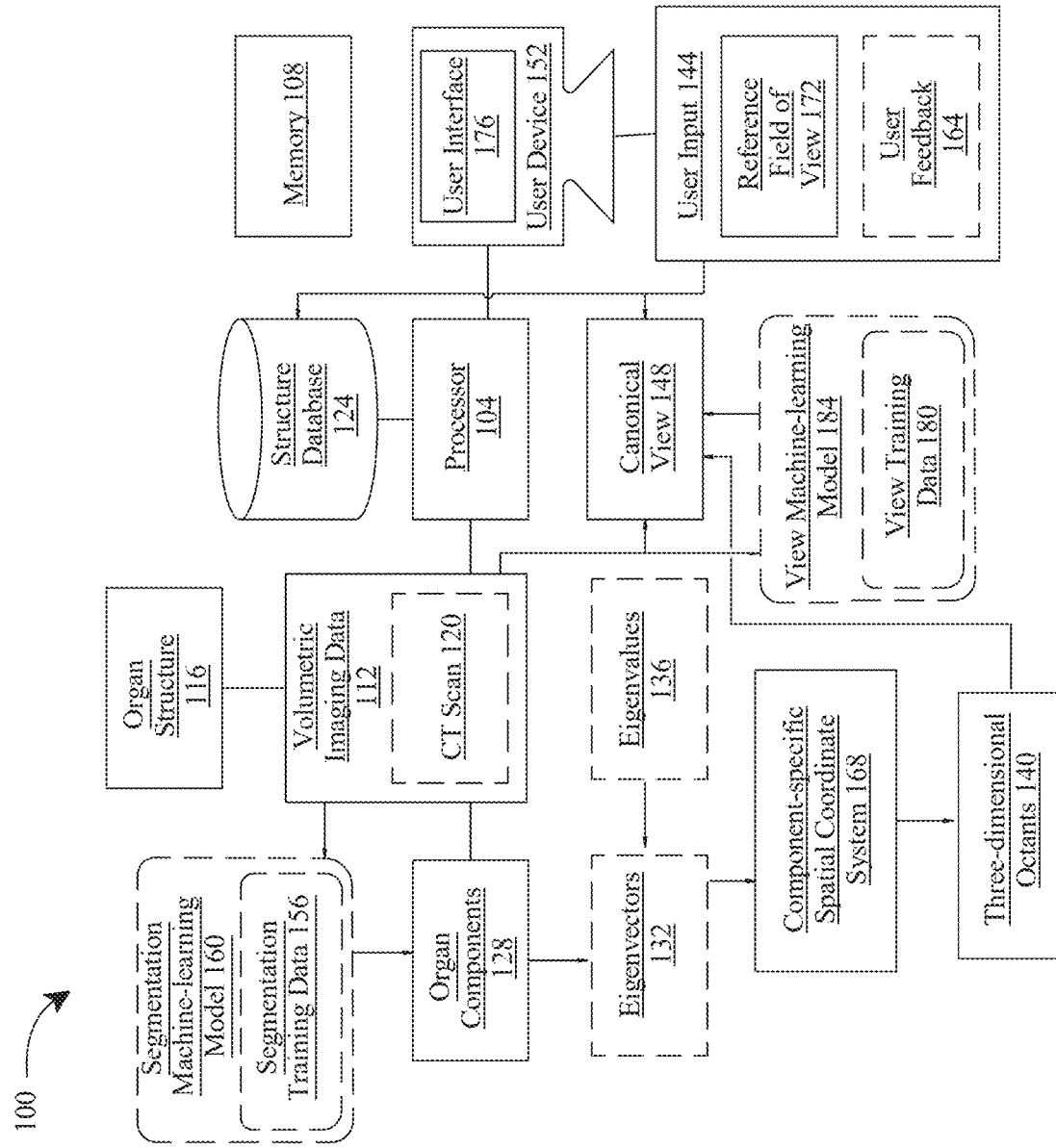
FIG. 1 illustrates a block diagram of an exemplary system for generating canonical views for volumetric imaging data.

Referring now to FIG. 1, an exemplary embodiment of an system 100 for generating canonical views for volumetric imaging data is illustrated. For the purposes of this disclosure, "volumetric imaging data" is three-dimensional imaging data representing anatomical structures of a subject. System 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive volumetric imaging data 112 representing at least one organ structure 116. For the purposes of this disclosure, "organ structure" is a collection of tissues joined in a structural unit to serve a common function. As a non-limiting example, organ structure may include liver, kidneys, lungs, pancreas, spleen, bladder, prostate, uterus, brain, spinal cord, or vascular structures. As used in this disclosure, a "cardiac structure" is an organ responsible for pumping blood through the circulatory system. As a non-limiting example, organ structure 116 may include a heart, chambers, valves, blood vessels, left atrial appendage (LAA), and associated structures that regulate the direction and efficiency of blood flow. In some embodiments, organ structure 116 may be shown in relation to surrounding structures, such as major blood vessels, valves, or adjacent tissues, to facilitate visualization, diagnosis, or procedural guidance. In some embodiments, organ structure 116 may be assessed for structural integrity, functional performance, or pathological conditions using imaging, computational modeling, or interventional techniques. In some embodiments, processor 104 may receive and use volumetric imaging data 112 of other anatomical structures. As a non-limiting example, processor 104 may receive and use volumetric imaging data 112 of the liver, kidneys, lungs, pancreas, spleen, bladder, prostate, uterus, brain, spinal cord, or vascular structures.

With continued reference to FIG. 1, in some embodiments, processor 104 may receive volumetric imaging data 112 from imaging modalities capable: for instance, and without limitation, computed tomography (CT), magnetic resonance imaging (MRI), three-dimensional ultrasound, or the like. In some embodiments, volumetric imaging data 112 may include a computed tomography (CT) scan 120. For the purposes of this disclosure, a "Computed Tomography scan" is a three-dimensional image acquired using computed tomography. For the purposes of this disclosure, "Computed Tomography" is a diagnostic imaging modality that captures multiple cross-sectional X-ray images of a patient's anatomy and reconstructs them into a three-dimensional (3D) representation. In some embodiments, CT scan 120 may include three-dimensional image of organ structure 116 along with metadata specifying spatial resolution, orientation, acquisition parameters, and patient-specific anatomical details.

With continued reference to FIG. 1, in some embodiments, processor 104 may receive volumetric imaging data 112 from an imaging device. For the purposes of this disclosure, an "imaging device" is a device or system configured to acquire visual representations of anatomical structures. As a non-limiting example, imaging device may include a CT scanner, magnetic resonance imaging (MRI) system, and the like.

With continued reference to FIG. 1, in some embodiments, system 100 may include a structure database 124. As used in this disclosure, "structure database" is a data structure configured to store data associated with an organ structure 116. As a non-limiting example, structure database 124 may store volumetric imaging data 112, organ components 128, eigenvectors 132, eigenvalues 136, three-dimensional (3D) octants 140, user input 144, canonical view 148, interacted three-dimensional octants, and the like. In one or more embodiments, structure database 124 may include inputted or calculated information and datum related to organ structures 116. In some embodiments, a datum history may be stored in structure database 124. As a non-limiting example, the datum history may include real-time and/or previous inputted data related to organ structures 116. As a non-limiting example, structure database 124 may include instructions from a user, who may be an expert user, a past user in embodiments disclosed herein, or the like, where the instructions may include examples of the data related to organ structures 116.

With continued reference to FIG. 1, in some embodiments, processor 104 may be communicatively connected with structure database 124. For example, and without limitation, in some cases, structure database 124 may be local to processor 104. In another example, and without limitation, structure database 124 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store structure database 124. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, structure database 124 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 104 may receive volumetric imaging data 112 from a user device 152. For the purposes of this disclosure, a "user device" is any device a user uses to input data. As a non-limiting example, user device 152 may include a laptop, desktop, tablet, mobile phone, smart phone, smart watch, kiosk, screen, smart headset, or things of the like. In some embodiments, user device 152 may include an interface configured to receive inputs from user. In some embodiments, user may manually input any data into system 100 using user device 152. In some embodiments, user may have a capability to process, store or transmit any information independently.

With continued reference to FIG. 1, memory 108 contains instructions configuring processor 104 to segment at least one organ structure 116 of volumetric imaging data 112 into a plurality of organ components 128. For the purposes of this disclosure, "organ components" are anatomically distinct substructures of an organ structure 116 that are segmented from volumetric imaging data. As a non-limiting example, organ components 128 may include left ventricle, right ventricle, left atrium, right atrium, aorta, pulmonary artery, interventricular septum, mitral valve, tricuspid valve, and left atrial appendage. In some embodiments, organ components 128 may be stored in structure database 124. In some embodiments, processor 104 may retrieve organ components 128 from structure database 124. In some embodiments, user may manually segment organ structure 116 of volumetric imaging data into a plurality of organ components 128.

With continued reference to FIG. 1, in some embodiments, segmenting at least one organ structure 116 may include generating segmentation training data 156, wherein the segmentation training data 156 may include exemplary volumetric imaging data and exemplary organ components, training a segmentation machine-learning model 160 using the segmentation training data 156 and segmenting the at least one organ structure 116 into plurality of organ components 128 using the trained segmentation machine-learning model 160. For the purposes of this disclosure, "segmentation training data" is data containing correlations that a machine-learning process may use to model relationships an organ structure 116 of volumetric imaging data and organ components. For the purposes of this disclosure, "segmentation machine-learning model" is a machine-learning model that segments an organ structure 116 of volumetric imaging data into a plurality of organ components. In some embodiments, processor 104 may be configured to generate segmentation training data 156. In some embodiments, segmentation training data 156 may be stored in structure database 124. In some embodiments, segmentation training data 156 may be received from one or more users, structure database 124, external computing devices, and/or previous iterations of processing. As a non-limiting example, segmentation training data 156 may include instructions from a user, who may be an expert user, a past user in embodiments disclosed herein, or the like, which may be stored in memory and/or stored in structure database 124, where the instructions may include labeling of training examples. In some embodiments, segmentation training data 156 may be updated iteratively on a feedback loop. As a non-limiting example, processor 104 may update segmentation training data 156 iteratively through a feedback loop as a function of volumetric imaging data 112, user feedback 164, user input 144, or the like. In some embodiments, processor 104 may be configured to generate a segmentation machine-learning model 160. In a non-limiting example, generating segmentation machine-learning model 160 may include training, retraining, or fine-tuning segmentation machine-learning model 160 using segmentation training data 156 or updated segmentation training data 156. In some embodiments, processor 104 may be configured to segment organ structure 116 of volumetric imaging data 112 into a plurality of organ components 128 using segmentation machine-learning model 160 (i.e. trained or updated segmentation machine-learning model 160). In some embodiments, generating training data and training machine-learning models may be simultaneous.

With continued reference to FIG. 1, in some embodiments, segmentation machine-learning model 160 may include feature extraction and segmentation algorithms. In some embodiments, segmentation algorithm may leverage techniques such as thresholding, edge detection, clustering, or machine-learning-based approaches to extract features of organ structure 116 of volumetric imaging data 112. As used in this disclosure, a "feature" is a structural or textural characteristic within an image that is identifiable. In an embodiment, feature may be used for analysis, such as anatomical boundaries, edges, shapes, or specific tissue properties, and the like. In an embodiment, feature may include elements like the endocardial border of the heart, valve leaflets, or the left atrial appendage, which are essential for accurate interpretation and procedural navigation. As used in this disclosure, a "segmentation algorithm" is a computational method designed to partition volumetric imaging data into distinct regions or categories based on predefined criteria. In an embodiment, predefined criteria may include, without limitation, intensity, texture, anatomical features, and the like. The segmentation algorithm may be used to identify and delineate specific organ structures 116 within medical imaging data, such as organs, tissues, or pathological regions, enabling more precise analysis and visualization. The segmentation algorithm may leverage techniques such as thresholding, edge detection, clustering, or machine-learning-based approaches to enhance accuracy and adapt to variations in image quality and anatomical differences. As a non-limiting example, segmentation algorithms may include Perona and Freeman algorithm, Shi and Malik algorithm, Scott and Longuet-Higgins algorithm, Costeira and Kanade algorithm, and the like. For example, and without limitation, Perona and Freeman algorithm may use the largest eigenvector, while Shi and Malik algorithm may use the second smallest generalized eigenvector.

With continued reference to FIG. 1, in some embodiments, segmentation machine-learning model 160 may utilize image segmentation, interpolation, machine learning algorithms, and the like. In an embodiment, segmentation algorithm may include edge detection techniques that analyze gradients in pixel intensity to identify the boundaries between anatomical structures or regions of interest. Without limitation, segmentation algorithms may apply filters such as Sobel, Canny, or Laplacian operators to highlight transitions in texture, density, or brightness within the image. Continuing, by identifying areas where there is a significant change in pixel value, the segmentation algorithm may delineate sharp contours or subtle transitions, even in noisy or low-contrast images. Without limitation, this may be useful for isolating soft tissue from bone or identifying tumor margins. Once edges are defined, the system may construct bounding regions or masks around the segmented areas (organ components 128). Additionally and/or alternatively, a classifier (segmentation machine-learning model 160) may be applied to assign labels to the bounded sections, such as identifying the segmented region as a specific organ, lesion, or procedural target. In an embodiment, the classifier may be trained using supervised learning techniques on volumetric imaging data 112 and/or organ components 128, allowing it to recognize patterns and features associated with different anatomical structures or pathological findings. For example, the classifier may differentiate between liver, kidney, and spleen regions based on shape, size, texture, and spatial orientation within the scan. Without limitation, the classifier may distinguish between benign and malignant lesions by analyzing edge sharpness, internal heterogeneity, or contrast enhancement patterns. These assigned labels may be used to inform subsequent diagnostic assessments, procedural planning, or real-time image-guided interventions, enhancing the utility and precision of the overall system.

With continued reference to FIG. 1, in some embodiments, segmentation machine-learning model 160 may include machine-learning-based segmentation. as used in this disclosure, "machine-learning-based segmentation" is a computational process that employs machine learning models to partition an image into meaningful regions. In an embodiment, the regions of the image machine-learning-based segmentation may be based on learned patterns, features, or pixel classifications (e.g., organ components 128). In an embodiment, the machine-learning-based segmentation may involve supervised, unsupervised, or deep learning approaches, such as convolutional neural networks (CNNs) or U-Net architectures, to differentiate anatomical structures, tissues, or abnormalities in medical imaging. In an embodiment, machine-learning-based segmentation may be used to automatically distinguish cardiac chambers, organ structures 116, organ components 128 or lesions from surrounding tissues in CT scans 120. In a non-limiting example, a deep learning model may segment the endocardial and epicardial borders of the left ventricle in real-time echocardiographic imaging, facilitating automated assessment of myocardial function. Additionally, machine-learning-based segmentation may be employed in intravascular ultrasound (IVUS) imaging to differentiate vessel lumen from plaque buildup, assisting in the evaluation of arterial stenosis and guiding interventional procedures.

With continued reference to FIG. 1, system 100 may use traditional computer vision techniques, such as the Scale-Invariant Feature Transform (SIFT). In an embodiment, SIFT may be applied to volumetric imaging data 112 to detect and describe distinctive local features across individual frames. Without limitation, each frame of volumetric imaging data 112 may be processed to identify key points that are invariant to scale and rotation, which may be useful in handling the variability inherent in freehand ultrasound acquisition. Continuing, without limitation, the key points may be localized and assigned orientations before generating gradient-based descriptors. Gradient-based descriptors may be used to compare volumetric imaging data 112 against a reference organ component to identify the "closest possible" match. Without limitation, the robustness of SIFT to illumination changes and geometric distortion makes it a strong candidate for consistent feature extraction in noisy ultrasound environments. Additionally and/or alternatively, the Histogram of Oriented Gradients (HOG) technique may be utilized to capture and quantify the structural shape information present in the volumetric imaging data 112. Each frame may be divided into cells in which local gradient orientations are analyzed to construct histograms that represent the underlying anatomical structure. Continuing, without limitation, these histograms may then be normalized across blocks to enhance contrast invariance, which can help account for varying image acquisition conditions. The HOG process may generate a stable feature vector for each frame, allowing for effective comparison against labeled canonical view templates. When combined with similarity scoring, the HOG descriptors may facilitate automated identification and sorting of ultrasound frames into relevant clinical views. However, while traditional methods offer interpretability and efficiency, they may lack the capacity to fully capture the complex variability present in volumetric imaging data 112. Without limitation, to address the complex variability in echocardiographic data, deep learning-based feature extraction may be employed using Convolutional Neural Networks (CNNs), which are capable of automatically learning hierarchical features from raw volumetric imaging data 112. Without limitation, system may train the CNN on a labeled dataset of organ components 128. This may permit the network to learn to extract features that are semantically rich and anatomically meaningful. Continuing, without limitation, these features may be used not only to classify frames but also to cluster similar organ components 128 across different patients, providing a powerful tool for real-time ultrasound interpretation. In this embodiment, each frame of volumetric imaging data 112 may be passed through the trained CNN, producing high-dimensional feature representations. These representations may then be compared using distance metrics such as cosine similarity or Euclidean distance to determine the most likely canonical view match. The learned features may be visualized or analyzed further to assess which organ components contributed most to the classification, offering insight into both the model's decision process and the underlying cardiac anatomy. Without limitation, one or more CNNs may adapt to various imaging artifacts and noise patterns common in ultrasound. This may make CNNs particularly well-suited for this domain.

With continued reference to FIG. 1, in some embodiments, combined use of traditional feature extraction methods and deep learning approaches may enhance the robustness and accuracy of ultrasound data analysis. For example, methods like SIFT and HOG may provide explainable and computationally efficient ways to extract structural features, CNNs offer adaptability and depth in learning complex anatomical variations. When applied in tandem or as complementary components of a hybrid pipeline, these techniques may significantly improve the segmentation of organ structure 116 of volumetric imaging data 112 to organ components 128, thereby streamlining the clinical workflow and supporting automated decision-making in cardiac imaging. Additional disclosure related to segmenting volumetric imaging data 112 may be found in U.S. Nonprovisional patent Ser. No. 19/253,505, filed on Jun. 27, 2025, entitled "APPARATUS AND METHOD FOR PROBE VISUALIZATION AND NAVIGATION DURING TRANSESOPHAGEAL ECHOCARDIOGRAM (TEE) IMAGING,", the entirety of which is incorporated herein as a reference.

With continued reference to FIG. 1, in some embodiments, processor 104 may be configured to compute, for each organ component 128 of a plurality of organ components 128, one or more eigenvectors 132 and corresponding eigenvalues 136, wherein the one or more eigenvectors 132 may define a component-specific spatial coordinate system 168. For the purposes of this disclosure, an "eigenvector" is a mathematical vector that defines a principal direction along which variance in a dataset is maximized. In some embodiments, eigenvector 132 may represent a dominant axis of shape variation within a specific organ component 128. As a non-limiting example, a first eigenvector may define a long axis of a left ventricle, a second eigenvector may define a direction orthogonal to the long axis along a short-axis plane, and a third eigenvector may define a direction orthogonal to both, completing a three-dimensional, component-specific coordinate system. For the purposes of this disclosure, an "eigenvalue" is a scalar quantity associated with an eigenvector that quantifies a magnitude of variance or deformation along that eigenvector. In a non-limiting example, higher eigenvalues may indicate greater variability in that direction within the structure. For the purposes of this disclosure, a "component-specific spatial coordinate system" is a coordinate frame that is defined for a specific organ component based on its geometry and dominant axes of variation. In some embodiments, component-specific spatial coordinate system 168 may be established using one or more eigenvectors 132. In a non-limiting example, a first axis of component-specific spatial coordinate system 168 may align with the long axis of the left ventricle, a second axis may align with the short-axis width, and a third axis may align with anterior-posterior depth. In some embodiments, these axes may be specific to a shape and orientation of the individual organ component 128 and may remain consistent regardless of the orientation of a patient or an imaging device.

With continued reference to FIG. 1, in some embodiments, processor 104 may compute eigenvector 132 using eigenvalue decomposition or principal component analysis (PCA). For the purposes of this disclosure, "principal component analysis" is a statistical technique used to reduce dimensionality of a dataset while preserving as much of its variance as possible. PCA transforms a set of correlated variables into a set of uncorrelated variables known as principal components, which are ordered by the amount of variance they capture from the original data. Each principal component may be defined by an eigenvector 132 and an associated eigenvalue 136. In a non-limiting example, processor 104 may perform principal component analysis (PCA) on a statistical shape model (organ component 128) of left atrial appendage (LAA) derived from a CT scan 120 (volumetric imaging data 112) to extract dominant axes of anatomical variation. For example, and without limitation, first eigenvector may represent a primary elongation axis of the LAA, a second eigenvector may capture its curvature in an orthogonal plane, and a third eigenvector may encode torsional deformation. Together, these eigenvectors 132 may define a right-handed orthonormal basis constituting a component-specific spatial coordinate system 168. In some embodiments, PCA may be applied to a set of aligned three-dimensional (3D) cardiac shapes or image-derived landmarks to identify dominant modes of anatomical variation across a population. In some embodiments, resulting principal components can be used to construct a statistical shape model (SSM), define component-specific spatial coordinate systems, or constrain reconstruction algorithms to anatomically plausible configurations.

With continued reference to FIG. 1, in some embodiments, computing one or more eigenvectors 132 and the corresponding eigenvalues 136 may include computing the one or more eigenvectors 132 and the corresponding eigenvalues 136 based on a spatial distribution of voxels within organ component 128. As used in this disclosure, a "voxel" is a volumetric pixel representing a discrete element of three-dimensional imaging data. In some embodiments, each voxel occupies a specific location in three-dimensional space and contains an intensity value corresponding to a physical property of tissue at that location: for instance, and without limitation, radiodensity in a computed tomography (CT) scan 120 or signal intensity in a magnetic resonance imaging (MRI) scan. In some embodiments, a voxel may be defined by its spatial coordinates (e.g., x, y, z) and its intensity value, and collectively, a set of voxels forms a volumetric representation of an anatomical structure. In some embodiments, voxels may represent a shape, volume, and spatial extent of an organ component 128. In a non-limiting example, spatial distribution of these voxels can be analyzed to determine principal directions of anatomical variation, from which eigenvectors 132 and eigenvalues 136 may be derived to establish a component-specific spatial coordinate system 168. In a non-limiting example, each organ structure 116, once segmented from volumetric imaging data 112, contains a set of voxels that have specific spatial positions. When these voxel coordinates are analyzed statistically, the direction along which the voxel positions exhibit the greatest variance may become the first eigenvector 132. Continuing the non-limiting example, second eigenvector 132 may be computed as the direction of second-greatest variance and may be orthogonal (i.e., at a 90-degree angle) to the first. The third eigenvector may be orthogonal to both the first and second, forming a complete, structure-specific 3D coordinate basis.

With continued reference to FIG. 1, memory 108 contains instructions configuring processor 104 to divide each organ component 128 into a plurality of three-dimensional octants 140 a segmentation algorithm. In some embodiments, dividing each organ component 128 into a plurality of three-dimensional octants 140 may include dividing each organ component 128 into the plurality of three-dimensional octants 140 using planes that are orthogonal to the eigenvectors 132 of component-specific spatial coordinate system 168. As used in this disclosure, "three-dimensional octants" are eight spatial subdivisions of a three-dimensional volume that result from partitioning the volume along three orthogonal planes. In some embodiments, the orthogonal planes may intersect at an origin of a coordinate system (component-specific spatial coordinate system 168). For example, and without limitation, the orthogonal planes may intersect at one defined by three orthogonal eigenvectors 132 corresponding to a principal anatomical axes of organ component 128. In some embodiments, each of the three planes may be orthogonal to one of the eigenvectors 132 and may divide the organ component 128 along that directional axis, thereby generating eight distinct volumetric regions (three-dimensional octants 140). In some embodiments, three-dimensional octants 140 may enable consistent spatial referencing within organ component 128 by categorizing anatomical subregions based on their position relative to a center of component-specific spatial coordinate system 168. For example, and without limitation, an anatomical feature located in the upper anterior right region of organ component 128 may be consistently identified within the same three-dimensional octant 140 across different patients, regardless of scan orientation.

With continued reference to FIG. 1, in some embodiments, dividing each organ component 128 into a plurality of three-dimensional octants 140 may include constructing an affinity matrix from features extracted from volumetric imaging data 112, computing one or more eigenvectors 132 of the affinity matrix and dividing each organ component 128 using a segmentation algorithm as a function of the one or more eigenvectors 132. For the purposes of this disclosure, an "affinity matrix" is a matrix that encodes pairwise similarity values between elements of volumetric imaging data. In some embodiments, each entry in affinity matrix may represent a numerical measure of how similar or related two data elements are based on spatial proximity, intensity, texture, anatomical labels, learned embeddings, or other descriptive features. In some embodiments, processor 104 may construct affinity matrix by computing a similarity function between all pairs of data elements within an organ component 128 or within a localized region of interest. As a non-limiting example, similarity function may include, but is not limited to, Gaussian kernels, dot products, learned distance metrics, or graph-based connectivity scores. In a non-limiting example, entries with higher affinity values may indicate stronger similarity or tighter coupling between the corresponding data elements. In another non-limiting example, lower values may indicate weaker relationships. As a non-limiting example, for a given set of voxels within a segmentation, affinity matrix may encode similarities based on voxel intensity and physical distance, such that adjacent voxels with similar intensities produce high affinity values. The matrix may be subsequently used to construct a normalized Laplacian for eigenvector computation, enabling spectral segmentation techniques that identify coherent regions within volumetric imaging data 112.

With continued reference to FIG. 1, memory 108 contains instructions configuring processor 104 to receive a user input 144, wherein the user input 144 includes a selection of a reference field of view 172 from volumetric imaging data 112. As used in this disclosure, "user input" is information provided by a user through a user interface. For the purposes of this disclosure, a "user" is any individual or entity that uses a system 100. As a non-limiting example, user may include radiologist, clinician, technician, or the like. As used in this disclosure, a "reference field of view" is a user-defined anatomical view selected from volumetric imaging data that represents a visualization of a structure of interest. In some embodiments, reference field of view 172 may correspond to a two-dimensional cross-section or reformat of volumetric imaging data 112. In a non-limiting example, a user may select a cross-sectional view that reveals four chambers of a heart in a long-axis orientation, a short-axis view of a left ventricle, or a view showing a left atrial appendage in relation to pulmonary veins.

With continued reference to FIG. 1, in some embodiments, processor 104 may receive user input 144 from user interface 176. For the purposes of this disclosure, a "user interface" is a means by which a user and a computer system interact; for example through the use of input devices and software. A user interface 176 may include a graphical user interface (GUI), command line interface (CLI), menu-driven user interface, touch user interface, voice user interface (VUI), form-based user interface, any combination thereof and the like. In some embodiments, user interface 176 may operate on and/or be communicatively connected to a decentralized platform, metaverse, and/or a decentralized exchange platform associated with the user. For example, a user may interact with user interface 176 in virtual reality. In some embodiments, a user may interact with the use interface using a computing device distinct from and communicatively connected to at least a processor 104. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, memory 108 contains instructions configuring processor 104 to determine which of a plurality of three-dimensional octants 140 are intersected by reference field of view 172. In some embodiments, determining which three-dimensional octants 140 are intersected may include spatially analyzing position and orientation of reference field of view 172 relative to a component-specific spatial coordinate system 168 associated with a segmented organ component 128. In a non-limiting example, each organ component 128 may be divided into a plurality of three-dimensional octants 140 based on planes orthogonal to its eigenvectors 132, thereby creating eight spatial regions that define localized anatomical zones. In some embodiments, reference field of view 172 may be defined as a two-dimensional slice, plane, or reformat within volumetric imaging data 112, selected by a user to highlight a particular anatomical or cardiac feature or region. In some embodiments, processor 104 may evaluate geometric intersection between reference field of view 172 and three-dimensional octants 140 of organ component 128. In a non-limiting example, three-dimensional octants 140 may be considered intersected if any portion of reference field of view 172 overlaps with spatial volume of the three-dimensional octants 140.

With continued reference to FIG. 1, determining which of the plurality of three-dimensional octants 140 are intersected by the reference field of view 172 includes storing a mapping of intersected three-dimensional octants 140 as a canonical view 148. As used in this disclosure, "canonical view" is a standardized imaging perspective and/or orientation that provide a consistent visualization of structures. In an embodiment, canonical view 148 may correspond to specific imaging planes, such as longitudinal, transverse, or oblique sections, which are used to evaluate anatomical features with minimal variability. In a non-limiting example, canonical view 148 may include views of the heart, including an apical four-chamber view, a parasternal long-axis view, and a subcostal view, to ensure uniform assessment of cardiac function. In another non-limiting example, canonical view 148 of coronary arteries at predefined cross-sectional levels may be used to evaluate plaque morphology and vessel dimensions. Additionally and or alternatively, canonical view 148 may include views of joints, tendons, and ligaments, such as a transverse view of the rotator cuff or a longitudinal view of the Achilles tendon, for diagnostic consistency.

As used in this disclosure, "mapping" refers to a data representation or index that encodes the spatial relationship between a reference field of view and three-dimensional octants of a segmented organ component. In some embodiments, three-dimensional octant 140 may be defined based on a component-specific spatial coordinate system 168 established using eigenvectors 132 computed from voxel distribution of organ component 128. In some embodiments, once reference field of view 172 is selected by a user, processor 104 may analyze which of eight three-dimensional octants 140 are intersected by the reference field of view 172. The intersected three-dimensional octants 140 may be then encoded as a set of identifiers, coordinates, or spatial indices that capture the orientation and location of the reference field of view 172 relative to internal geometry of organ component 128 (e.g., segmented organ component 128). This set of intersected three-dimensional octants 140, when stored, may become a canonical view 148. The canonical view 148 may be a reusable spatial definition that can be applied across different patients to automatically regenerate the same anatomical perspective. In some embodiments, canonical view 148 may be stored in a structure database 124, linked to metadata such as anatomical region, clinical relevance, or acquisition parameters, and retrieved later for automated view reconstruction. In some embodiments, canonical view 148 may be based on component-specific spatial coordinate system 168. In some embodiments, canonical view 148 may enable reproducible, anatomy-aligned view generation even when the absolute positioning of the anatomy differs between patients or imaging sessions.

With continued reference to FIG. 1, in some embodiments, storing mapping of intersected three-dimensional octants 140 may include encoding the intersected three-dimensional octants 140 as a set of indices associated with component-specific spatial coordinate system 168. As used in this disclosure, "encoding" refers to a process of digitally representing spatial relationships between a reference field of view and an organ structure 116. In some embodiments, each three-dimensional octant 140, defined by its position within three-dimensional volume of an organ component 128, may be assigned an index or identifier that reflects its location relative to the origin and axes of the component-specific spatial coordinate system 168. In some embodiments, component-specific spatial coordinate system 168 may be established by computing orthogonal eigenvectors 132 based on voxel distribution of segmented organ component 128. These eigenvectors 132 may define intrinsic anatomical axes that divide the organ component 128 into eight three-dimensional octants 140, each located in a unique spatial quadrant (e.g., anterior-superior-right, posterior-inferior-left). In a non-limiting example, when a reference field of view 172 intersects one or more of these three-dimensional octants 140, processor 104 may determine which specific three-dimensional octants 140 are involved and may assign them corresponding indices (e.g., binary values, coordinate triplets, or unique identifiers) that are explicitly tied to eigenvector-defined axes of the organ component 128. In some embodiments, the resulting set of octant indices may be stored in structure database 124 as part of the canonical view definition.

With continued reference to FIG. 1, memory 108 contains instructions configuring processor 104 to output a selection of volumetric imaging data 112 as a function of canonical view 148. In some embodiments, outputting a selection of volumetric imaging data 112 as a function of canonical view 148 may include generating and presenting a visualization or representation of three-dimensional medical imaging dataset in a standardized, anatomically meaningful orientation that corresponds to a canonical view 148. In some embodiments, volumetric imaging data 112 with canonical view 148 may be rendered in a form of a two-dimensional cross-section, a multi-planar reconstruction (MPR), or a volume-rendered image aligned with component-specific spatial coordinate system 168. In a non-limiting example, this alignment can ensure that canonical view 148 is anatomically consistent across different patients, regardless of variations in imaging acquisition or patient positioning. In some embodiments, outputting a selection of volumetric imaging data 112 may include generating a graphical user interface 176 configured to display volumetric imaging data 112 in canonical view 148. In some embodiments, outputting a selection of volumetric imaging data 112 may include outputting or displaying two-dimensional image related to volumetric imaging data 112. In some embodiments, a selection of two-dimensional image may be based on a canonical view 148, a simulated ultrasound probe orientation, or a user-defined selection, as described herein. As a non-limiting example, processor 104 may be configured to generate and display a two-dimensional axial, sagittal, or coronal slice through volumetric imaging data 112 on a graphical user interface (GUI), enabling a user to view specific anatomical regions at canonical view 148.

With continued reference to FIG. 1, in some embodiments, volumetric imaging data 112 with canonical view 148 may be transmitted to a clinical workstation, or saved in a file format compatible with diagnostic imaging systems. In some embodiments, outputting a selection of volumetric imaging data 112 as a function of canonical view 148 may allow clinicians, researchers, or automated diagnostic systems to assess the same anatomical orientation across multiple datasets without requiring manual adjustment of imaging planes. This can improve reproducibility, reduces variability in interpretation, and facilitates integration into standardized workflows for diagnosis, treatment planning, or machine learning-based analysis. In some embodiments, canonical view 148 may be rendered as a two-dimensional projection that aligns with one or more eigenvectors 132. As used in this disclosure, a two-dimensional projection refers to a flattened representation of volumetric imaging data displayed on a plane. In some embodiments, two-dimensional projection may be generated by extracting a slice, plane, or surface from volumetric imaging data 112, oriented to align with specific anatomical directions derived from the underlying geometry of organ structure 116. In some embodiments, orientation of two-dimensional projection may be determined by one or more eigenvectors 132, which may be computed from the voxel distribution of a segmented organ component 128 and reference field of view 172 and represent the principal axes of anatomical variation. In some embodiments, rendering the canonical view along an eigenvector-aligned plane can ensure consistency across different patient datasets by eliminating variations introduced by patient positioning or scan acquisition angles.

With continued reference to FIG. 1, in some embodiments, outputting a selection of volumetric imaging data 112 as a function of canonical view 148 may include receiving a user input 144 defining the selection of the volumetric imaging data 112 using a simulated ultrasound probe and displaying the volumetric imaging data 112 on a user interface 176 as a function of the user input 144. For the purposes of this disclosure, a "simulated ultrasound probe" is a graphical representation of an ultrasound or imaging transducer. In some embodiments, user may digitally position and orient simulated ultrasound probe within displayed volumetric imaging data 112 to simulate a field of view and image acquisition characteristics of a physical imaging probe. In some embodiments, user may use a simulated ultrasound probe through a graphical user interface (GUI) to interactively define or select a location, viewing angle, scanning plane or reference field of view 172 within volumetric imaging data 112 and processor 104 may generate a corresponding cross-sectional or planar image based on the selection. In some embodiments, simulated ultrasound probe may include probe position coordinates, directional orientation vectors, simulated beam geometry (e.g., sector width, depth of field), and the like, which can determine a subset of volumetric imaging data 112 to be visualized.

With continued reference to FIG. 1, in some embodiments, outputting a selection of volumetric imaging data 112 as a function of canonical view 148 may include generating view training data 180, wherein the view training data 180 may include exemplary volumetric imaging data paired with manually labeled canonical views, training a view machine-learning model 184 using the view training data 180, inputting volumetric imaging data 112 into the view machine-learning model 184 and outputting a selection of volumetric imaging data 112 as a function of canonical view 148 using the trained view machine-learning model 184. For the purposes of this disclosure, "view training data" is data containing correlations that a machine-learning process may use to model relationships volumetric imaging data and canonical views. For the purposes of this disclosure, "view machine-learning model" is a machine-learning model that outputs volumetric imaging data with a canonical view. In some embodiments, processor 104 may be configured to generate view training data 180. In some embodiments, view training data 180 may be stored in structure database 124. In some embodiments, view training data 180 may be received from one or more users, structure database 124, external computing devices, and/or previous iterations of processing.

As a non-limiting example, view training data 180 may include instructions from a user, who may be an expert user, a past user in embodiments disclosed herein, or the like, which may be stored in memory and/or stored in structure database 124, where the instructions may include labeling of training examples. In some embodiments, view training data 180 may be updated iteratively on a feedback loop. As a non-limiting example, processor 104 may update view training data 180 iteratively through a feedback loop as a function of volumetric imaging data 112, user input 144, user feedback 164, eigenvectors 132, or the like. In some embodiments, processor 104 may be configured to generate a view machine-learning model 184. In some embodiments, view machine-learning model 184 may function differently between training time and inference time. In a non-limiting example, at training time, processor 104 may be configured to train, retrain, or fine-tune view machine-learning model 184 using view training data 180. During the training time, view machine-learning model 184 may learn to associate patterns within volumetric imaging data 112 with labeled canonical views. In a non-limiting example, at inference time, trained view machine-learning model 184 may be configured to receive previously unseen volumetric imaging data 112 and, based on the representations learned during training time, automatically output a selection of volumetric imaging data 112 corresponding to canonical view 148. Inference may be triggered in response to a user request, system event, or automated workflow operation.

With continued reference to FIG. 1, in some embodiments, receiving user input 144 may include receiving user feedback 164 of the user input 144, wherein the user feedback 164 may be associated with canonical view 148 and updating the canonical view 148 stored in a database (e.g., structure database 124) as a function of the user feedback 164, wherein updating the canonical view 148 may include removing the canonical view 148 from the database (e.g., structure database 124). As used in this disclosure, "user feedback" is a user's evaluation, correction, or validation of volumetric imaging data. In some embodiments, user feedback 164 may be provided through a graphical user interface (GUI), checkbox, input field, or any other interactive mechanism that allows a user to express approval, disapproval, or suggest modifications to canonical view 148 and/or volumetric imaging data 112. In some embodiments, user feedback 164 may be directly associated with a canonical view 148 stored in a structure database 124 that contains indexed and encoded mappings of canonical views 148. In some embodiments, processor 104 may be configured to interpret user feedback 164 as a trigger for updating stored canonical view 148. In some embodiments, update may take various forms, including but not limited to modifying spatial mapping (e.g., changing intersected octant indices), reassigning canonical view 148 to a different anatomical category or organ component 128, or, in certain cases, removing canonical view 148 entirely from structure database 124. In a non-limiting example, removing canonical view 148 from structure database 124 may be performed in response to user feedback 164 indicating that canonical view 148 is inaccurate, no longer clinically relevant, or misaligned with the intended anatomical perspective.

With continued reference to FIG. 1, when users interact with the software, their actions, user input 144 preferences, and user feedback 164 provide valuable information that can be used to refine and enhance machine-learning models. This user input may be collected and incorporated into the training data, allowing machine learning models to learn from real-world interactions and adapt its predictions accordingly. By continually incorporating user input 144, machine learning models becomes more responsive to user needs and preferences, capturing evolving trends and patterns. This iterative process of updating training data with user input 144 enables machine learning models to deliver more personalized and relevant results, ultimately enhancing the overall user experience. The discussion within this paragraph may apply to both segmentation machine-learning model 160, view machine-learning model 184, and any other machine-learning model/classifier discussed herein. Incorporating the user feedback 164 may include updating training data by removing or adding correlations of training data to a path or resources as indicated by the user feedback 164. Any machine-learning model as described herein may have the training data updated based on such feedback or data gathered using any method described herein. For example, when correlations in training data are based on outdated information, a web crawler may update such correlations based on more recent resources and information.

With continued reference to FIG. 1, processor 104 may use user feedback 164 to train machine-learning models and/or classifiers described herein in this disclosure. For example, machine-learning models and/or classifiers may be trained using past inputs and outputs of the machine-learning model. In some embodiments, if user feedback 164 indicates that an output of machine-learning models and/or classifiers was "unfavorable," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, machine-learning models may be retrained with modified training data as described in further detail below.

With continued reference to FIG. 1, in some embodiments, outputting a selection of volumetric imaging data 112 as a function of canonical view 148 may include converting the volumetric imaging data 112 into ultrasound simulation data and displaying the ultrasound simulation data on a user interface 176.

As used herein, "ultrasound simulation data" refers to pseudo ultrasound data simulated from other imaging data. In an embodiment, ultrasound simulation data may be generated as a function of 3D imaging data, specifically CT imaging data. In an embodiment, ultrasound simulation data may include volumetric imaging data 112 and probe position data. As used throughout this disclosure, "ultrasound data" refers to one or more of real, measured acoustic signals captured during an ultrasound procedure or synthetic or reconstructed data derived from processing volumetric imaging data 112. For example, volumetric imaging data 112 may include the actual imaging obtained from ultrasound signals, such as sound waves emitted by the probe and the echoes that return from tissues and volumetric imaging data 112 may include imaging data, echo signal data, brightness mode image data, doppler ultrasound data, 3D/4D ultrasound data, elastography (tissue stiffness) data, motion mode data, tissue characterization and imaging parameters, quantitative measurements, time and motion data, color doppler data, power doppler data, color-enhanced ultrasound data, and/or other associated data. Additionally, and/or alternatively, volumetric imaging data 112 may include pseudo data, such as 3D reconstructed images, surface models, fusion data, and/or the like. In one or more embodiments, volumetric imaging data 112 may include TEE data, CT data, point-of-care ultrasound data, and/or the like. Further, in some embodiments, this data may mimic what would be obtained from real ultrasound scans but may include pseudo data generated from plurality of volumetric imaging data 112. "Probe position data," as used herein, refers to the spatial information about a simulated ultrasound probe's location and/or orientation. For example, probe position data may include, without limitation, spatial coordinates, orientation and angle, probe position in relation to the body, tracking data, probe depth and pressure, probe type and configuration, ultrasound beam direction, tracking system integration data, calibration information, temporal data, and/or other associated data. In an embodiment, probe position data may record the ultrasound probe's movements, angles, and/or the depth of the scanning field, ensuring accurate representation of how different probe positions may affect the ultrasound image. This data may allow for dynamic visualizations and interactions, mimicking how a real ultrasound probe is used during an actual clinical procedure.

In further reference to FIG. 1, in an embodiment, probe position data may include a position and orientation of a simulated ultrasound probe in relation to at least a 3D model of the plurality of volumetric imaging data 112 and one or more movements of the ultrasound probe in relation to at least a 3D model of the plurality of volumetric imaging data 112. In an embodiment, probe position data may capture both static and/or dynamic information. For example, position may include the spatial coordinates of the ultrasound probe at a given moment in time, indicating its location relative to a target 3D model. This may aid in mapping the exact placement of the probe relative to a patient and/or a specific region of interest within the model. Orientation may include the angular position and/or rotation of the ultrasound probe, in some cases, orientation may be represented as a set of angles and/or rotation matrix that describes the ultrasound probe's angle relative to a reference plane, such as the anatomical position of a patient and/or a model. The orientation may ensure that the ultrasound probe is aligned correctly for imaging from the appropriate angle. One or more movements may include data describing the continuous and/or discrete movements of an ultrasound probe over time in relation to a 3D model. For example, this may include the trajectory and/or path taken by the ultrasound probe, as well as changes in orientation as a user manipulates the ultrasound probe. Further, one or more movements may help track how the ultrasound probe is swept across the model and/or how it rotates. In an embodiment, the ultrasound probe position data may be tied to one or more 3D models representing the anatomy or organs of interest. The 3D models may include models derived from plurality of volumetric imaging data 112, which may, in some cases, include 3D models constructed from 2D images/scans. By integrating probe position data with plurality of volumetric imaging data 112, it may be possible to visualize the exact positioning and movements of the ultrasound probe during the scanning process.

Still referring to FIG. 1, in an embodiment, probe position data may include one or more movements of the ultrasound probe over time, wherein each position and orientation is correlated to a corresponding temporal element. As used herein, a "temporal element" refers to any component, factor, or aspect that is related to time. For example, temporal elements may refer to time itself, the passage of time, and/or any events and/or changes that occur and/or evolve over time. For example, a temporal element may refer to timestamps, time-based triggers, and/or any data that is indexed and/or processed with respect to time, such as real-time data, time-series data, and/or the time interval between events. In an embodiment, a temporal element may correspond to a time step, and at least a processor 104 may continuously update the position and orientation of the ultrasound probe based on real-time inputs. A "time-step," as used throughout this disclosure, refers to a fixed or variable interval of time used to update data at regular intervals. Each time-step may represent a moment in the system's real-time operation, and it may be used to guide when and how new measurements and/or updates are made. For example, in an ultrasound system, a time-step may correspond to the frame rate of the imaging system, which may dictate how frequently the system updates the position and orientation of the ultrasound probe. In an embodiment, real-time inputs may come from sensors, cameras, and/or tracking systems attached to the ultrasound probe. Additionally, and/or alternatively, these systems may be simulated in the case of a simulation. These inputs may capture the position and orientation of the ultrasound probe at each time-step. These sensors may include accelerometers, gyroscopes, magnetometers, and/or external tracking systems that provide continuous feedback about the ultrasound probe's movements relative to a reference 3D model and/or physical space. In an embodiment, at least a processor 104 may take incoming sensor data at each time-step, compute the new position and orientation of the ultrasound probe, and update the system's 100 state. This may allow system 100 to maintain an up-to-date and accurate representation of the ultrasound probe's location and movement in space. At least a processor 104 may use time-step data to calculate the ultrasound probe's new position based on its previous position and any changes detected by the sensors. Similarly, at least a processor 104 may update the ultrasound probe's orientation based on the real-time input from the sensors. If the ultrasound probe is rotated and/or tilted in any direction, at least a processor 104 may recalculate its orientation at each time-step.

With further reference to FIG. 1, in an embodiment, during an ultrasound scan, system 100 may track static probe position, as well as continuously monitoring dynamic movements, such as the ultrasound probe's shifts in space and/or rotations, along with how these movements correspond to the structures within the 3D model. These aspects may be useful in a variety of scenarios. For example, this may be useful in guiding a clinician, reconstructing detailed images, and/or improving ultrasound navigation systems. By providing real-time feedback on where the ultrasound probe is and how it relates to a 3D model, this data may help clinicians make better decisions about ultrasound placement, which may ensure more accurate scans. Further, system 100 may use the position and orientation data to create more accurate 3D visualizations, such as 3D models, of the scanned area, potentially improving diagnostic accuracy. By integrating movement and position data, system 100 may be used to create an intuitive interface that tracks the ultrasound probe's path through 3D volume, assisting in multi-planar imaging and/or visualizing the anatomy in 3D as the ultrasound probe moves.

With continued reference to FIG. 1, in an embodiment, generating ultrasound simulation data may include finite element modeling (FEM). "FEM," as used herein, is a method that simulates how sound waves propagate through different tissues in the body. By creating a detailed computational model of the human body, or specific organs, FEM may simulate how ultrasound waves interact with various tissue types, how they are reflected, and/or how echoes return to the probe. The result may include a synthetic representation of how an ultrasound image may appear.

In further reference to FIG. 1, in an embodiment, generating ultrasound simulation data may include ray tracing and acoustic propagation models. "Ray tracing," as used throughout this disclosure, is a method that models the path of sound waves as they travel through tissues and interact with structures, such as organs, muscles, and blood vessels. "Acoustic propagation models," as used herein, is a method used to simulate how sound waves are reflected, refracted, or absorbed by different materials. In an embodiment, acoustic propagation models may generate ultrasound images that mimic real-life scans.

Continuing to reference FIG. 1, generating ultrasound simulation data may include generating ultrasound signals based on predefined tissue characteristics. For example, predefined tissue characteristics may include elasticity, density, and/or speed of sound. These signals may be processed to simulate how an ultrasound system may capture the resulting echoes and translate them into an image. Further, in some embodiments, generating ultrasound simulation data may include generating ultrasound simulation data from reference data. For example, real ultrasound scans and/or other related data from structure database 124, may be used as reference points. By modifying these images based on simulated probe positions, angles, and/or tissue alterations, synthetic ultrasound images may be generated for specific scenarios, such as different pathologies and/or anatomical variations. Additional disclosure related to generating ultrasound simulation data may be found in U.S. Nonprovisional patent Ser. No. 19/188,841, filed on Apr. 24, 2025, entitled "SYSTEM AND METHOD FOR SWEEP TRAJECTORY SIMULATION," the entirety of which is incorporated herein as a reference.

Figure 2:
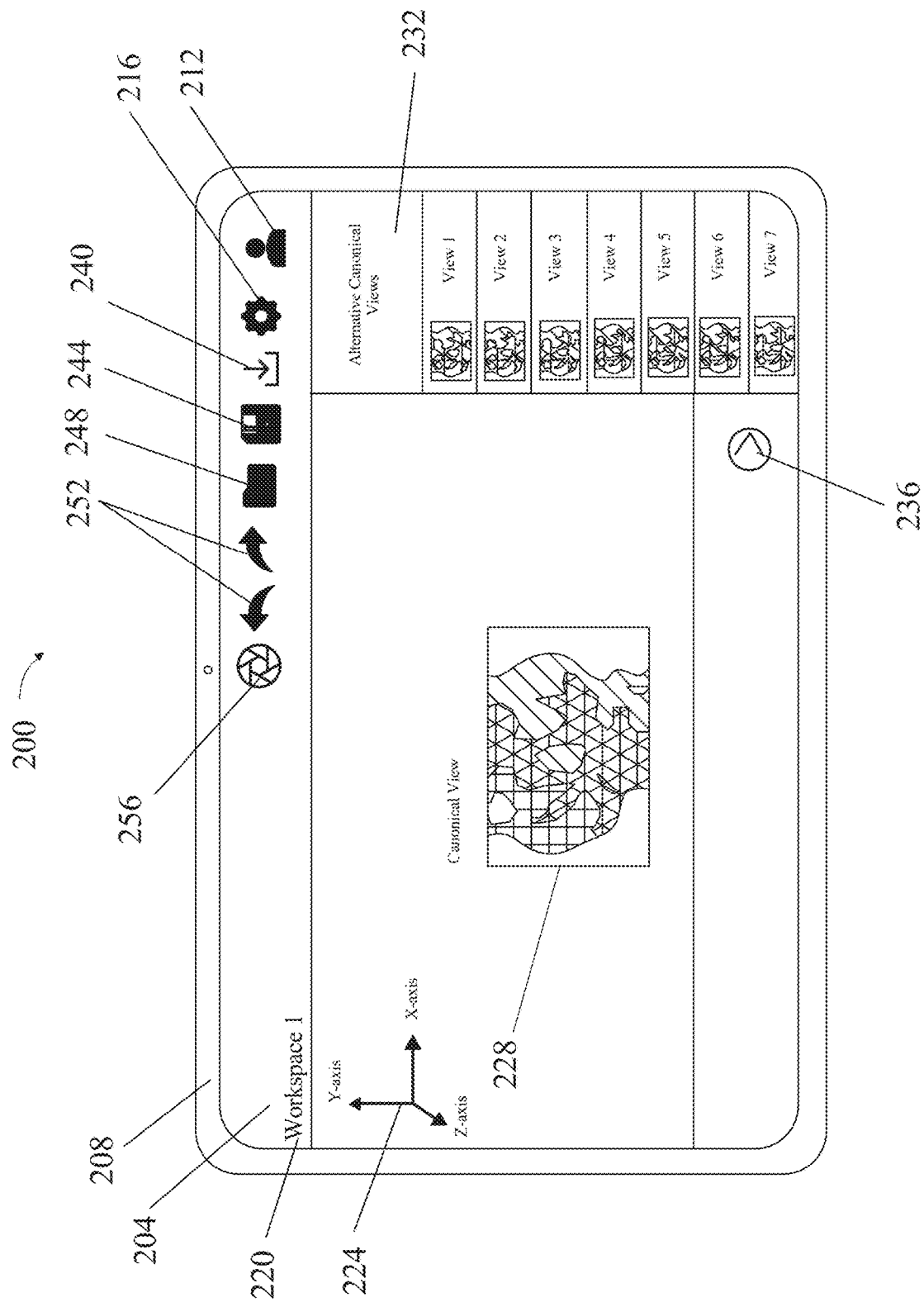
FIG. 2 illustrates an exemplary user interface displaying volumetric imaging data with a canonical view.

Referring now to FIG. 2, an exemplary illustration 200 of a graphical user interface. In an embodiment, the graphical user interface (GUI) 204 may be displayed on a user device 208. In an embodiment, the user device 208 may include a smartphone, tablet, or computer. In an embodiment, the GUI 204 may include a user profile icon 212. In an embodiment, the user profile icon 212 may serve as an interactive element that allows users to access and manage their personal account settings. In an embodiment, the user profile icon 212 may provide a direct link to the user's profile, where they may update personal information, review activity history, and configure preferences related to their interactions within the system. In an embodiment, the user profile icon 212 may enable users to modify details such as their name, contact information, medical history, or security settings. In an embodiment, the user profile icon 212 may serve as a gateway to account-related features, including login credentials, privacy controls, and system permissions. In an embodiment, the user profile icon 212 may support multi-user functionality, allowing different users to switch profiles or customize their experience within the same system. In an embodiment, the user profile icon 212 may incorporate a visual indicator, such as a profile picture placeholder, initials, or a silhouette, providing a recognizable representation of the user. In an embodiment, the user profile icon 212 may include a notification badge, alerting users to profile-related updates, messages, or required actions. In an embodiment, the user profile icon 212 may facilitate seamless user management and personalization within the GUI 204. In an embodiment, the GUI 204 may include a gear icon 216. The GUI 204 may incorporate a gear icon 216, which may provide access to system settings, allowing users to customize preferences, adjust configurations, or manage administrative controls. In an embodiment, the GUI 204 may include a header 220. In an embodiment, the header 220 may include the title of the application, a logo, a timestamp of the current session, user information (e.g., logged-in user's name), and/or a breadcrumb navigation bar showing the current workflow stage. In an embodiment, the GUI 204 may include a coordinate system 224. In an embodiment, the coordinate system 224 may include a grid overlay, labeled axes, such as X, Y, and Z for 3D visualization, and numerical indicators that help align and position images or models accurately. In an embodiment, the GUI 204 may include volumetric imaging data with a canonical view 228. In an embodiment, the canonical view 228 may be displayed as a thumbnail, split-screen, or overlay. In an embodiment, the GUI 204 may include one or more alternative canonical view 232. In an embodiment, the one or more alternative canonical views 232 may include selectable thumbnails of different representations, a dropdown menu allowing the user to choose between multiple views, or an option to generate additional alternative views. In another embodiment, the GUI 204 may include one or more organ components with canonical view 228 and/or alternative canonical views 232.

In an embodiment, the GUI 204 may include a next button 236. In an embodiment, the next button 236 may include a clickable arrow or labeled button such as "Next," that allows users to proceed to the next alternative canonical view 232 or organ component. In an embodiment, the GUI 204 may include a download button 240. In an embodiment, the download button 240 may include a cloud or arrow-down icon that, when clicked, saves the matched canonical view or other relevant data in a specified file format, such as DICOM, PNG, or CSV. In an embodiment, the GUI 204 may include a save button 244. In an embodiment, the save button 244 may include a floppy disk icon or labeled button such as, "Save Progress," that stores any user input or user feedback related to canonical view or reference field of view. In an embodiment, the GUI 204 may include an open button 248. In an embodiment, the open button 248 may include a folder or file icon that allows users to browse and load previously saved canonical views or datasets. In an embodiment, the GUI 204 may include an undo/redo button 252. In an embodiment, the undo/redo button 252 may include curved arrows, one pointing left for undo, one pointing right for redo, which allow users to revert or reapply recent changes to the matched canonical view. In an embodiment, the GUI 204 may include a capture button 256. In an embodiment, the capture button 256 may include a camera icon or labeled button, such as "Capture Image," that enables users to take a sweep using the at least a transducer, which may then be saved, analyzed, or shared. Upon activation, the capture button 256 may trigger the transducer to begin collecting volumetric imaging data from a manual sweep, which may involve scanning or imaging a structure within a patient in real-time. The sweep may capture data in various formats, such as 2D grayscale images, 3D volumetric scans, or time-sequenced imaging frames, depending on the capabilities of the transducer and the imaging modality being utilized. The captured data may be automatically stored in memory or a designated database, where it may be processed, analyzed, or compared against existing reference data. Additionally and or alternatively, the system may provide users with options to annotate, adjust, or enhance the captured image before saving or sharing it. In some embodiments, the capture button 256 may be accompanied by status indicators, such as a flashing recording symbol, a progress bar, or a confirmation message, to provide feedback to the user during the capture process. The capture button 256 may also support shortcut functionalities, such as longpress activation for continuous scanning or double-tap for capturing multiple frames. Without limitation, the capture button 256 may be integrated with workflow automation, allowing the apparatus to automatically label, tag, or pre-process the captured data based on predefined parameters. This ensures efficiency and consistency in data management, particularly in applications such as medical imaging, industrial inspections, or computer vision-based analysis.

Figure 3:
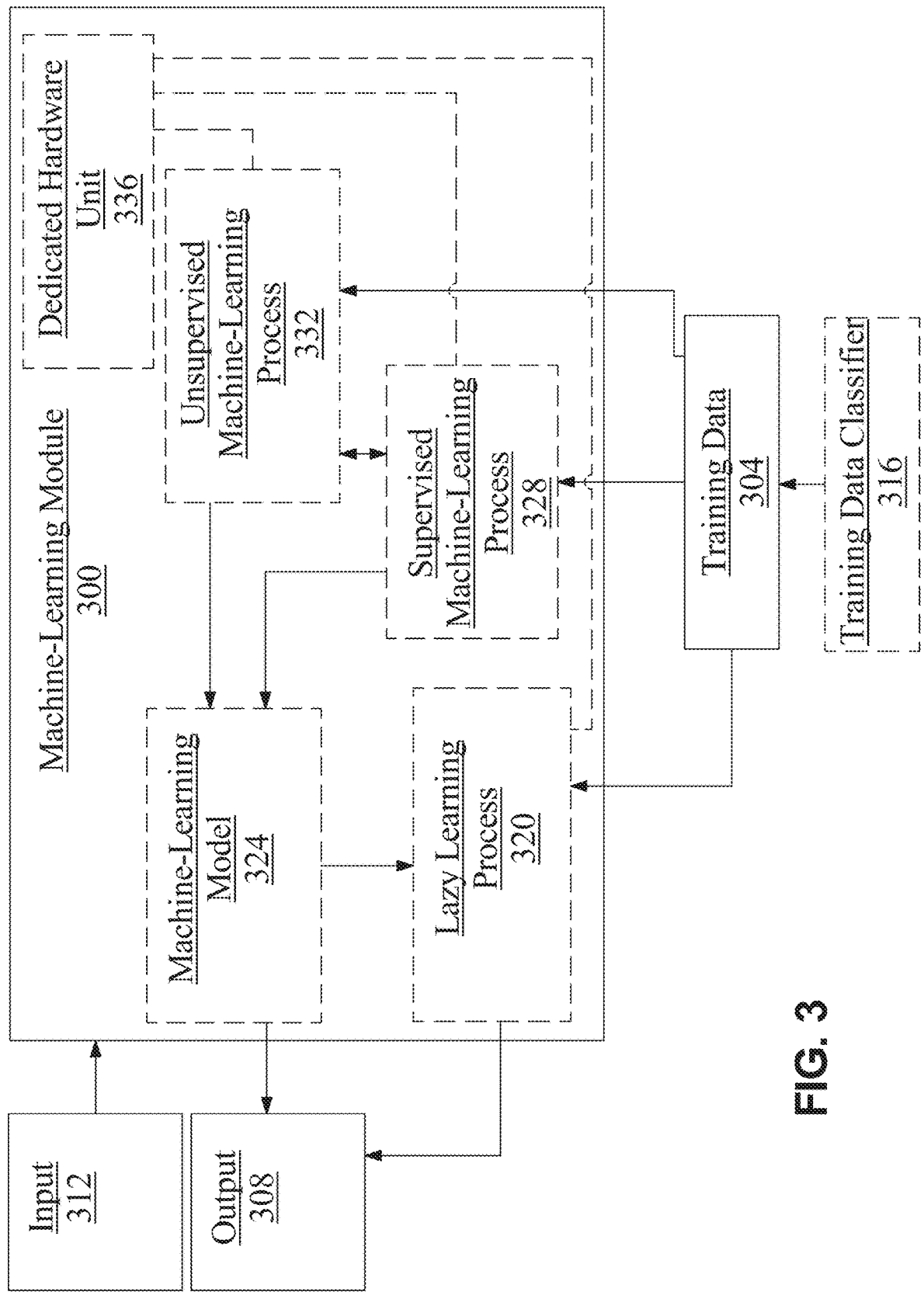
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include volumetric imaging data, eigenvectors, eigenvalues, organ components, user inputs, user feedback, three-dimensional octants, and the like. As a non-limiting illustrative example, output data may include eigenvectors, eigenvalues, organ components, user inputs, user feedback, three-dimensional octants, canonical views, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to patient cohorts related to patient demographic, medical history, medical conditions, and the like. As a non-limiting example, training data classifier 316 may classify elements of training data to structure cohorts related to types of anatomical structure, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include volumetric imaging data, eigenvectors, eigenvalues, organ components, user inputs, user feedback, three-dimensional octants, and the like as described above as inputs, eigenvectors, eigenvalues, organ components, user inputs, user feedback, three-dimensional octants, canonical views, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
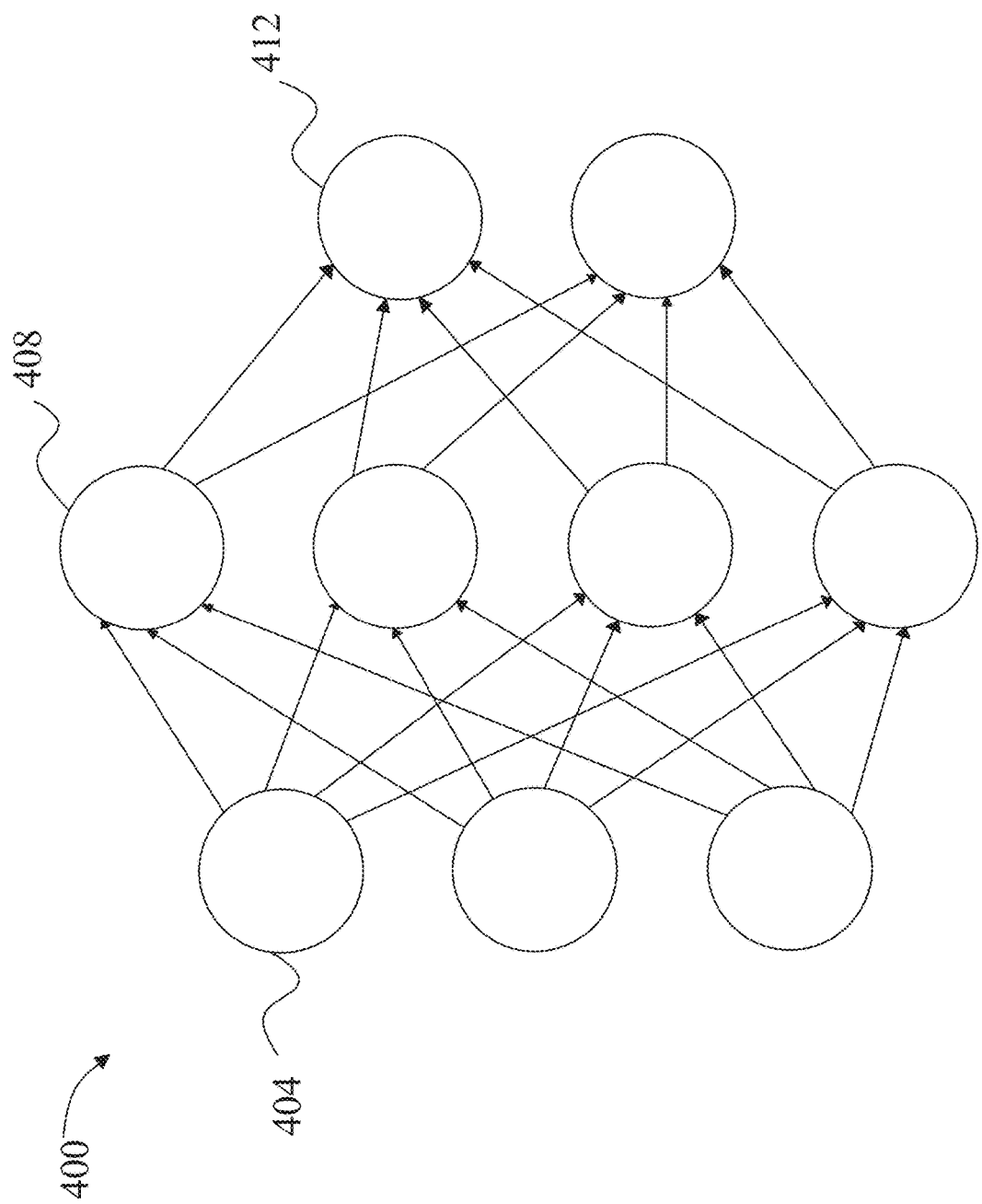
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
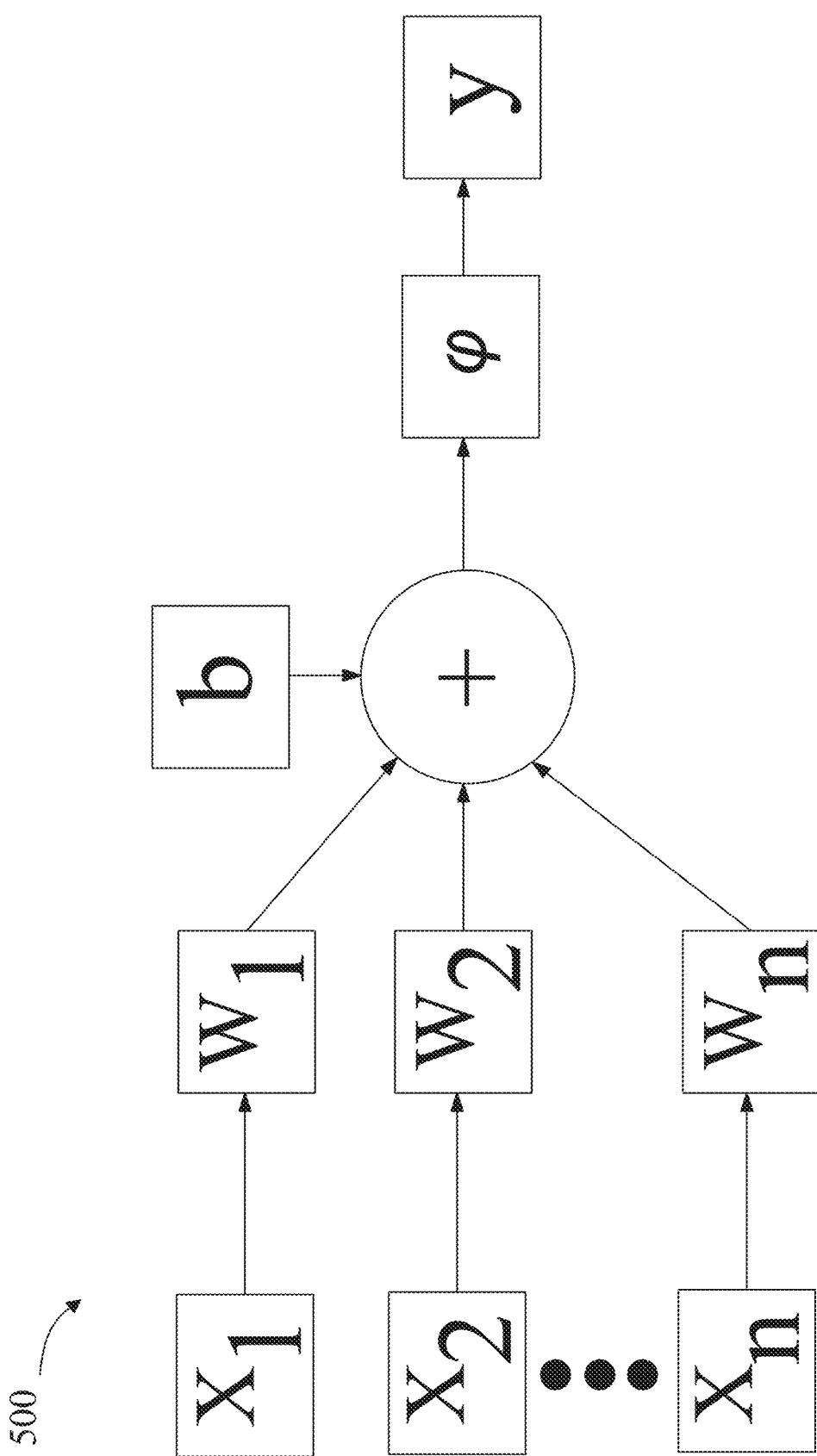
FIG. 5 illustrates a block diagram of an exemplary node in a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
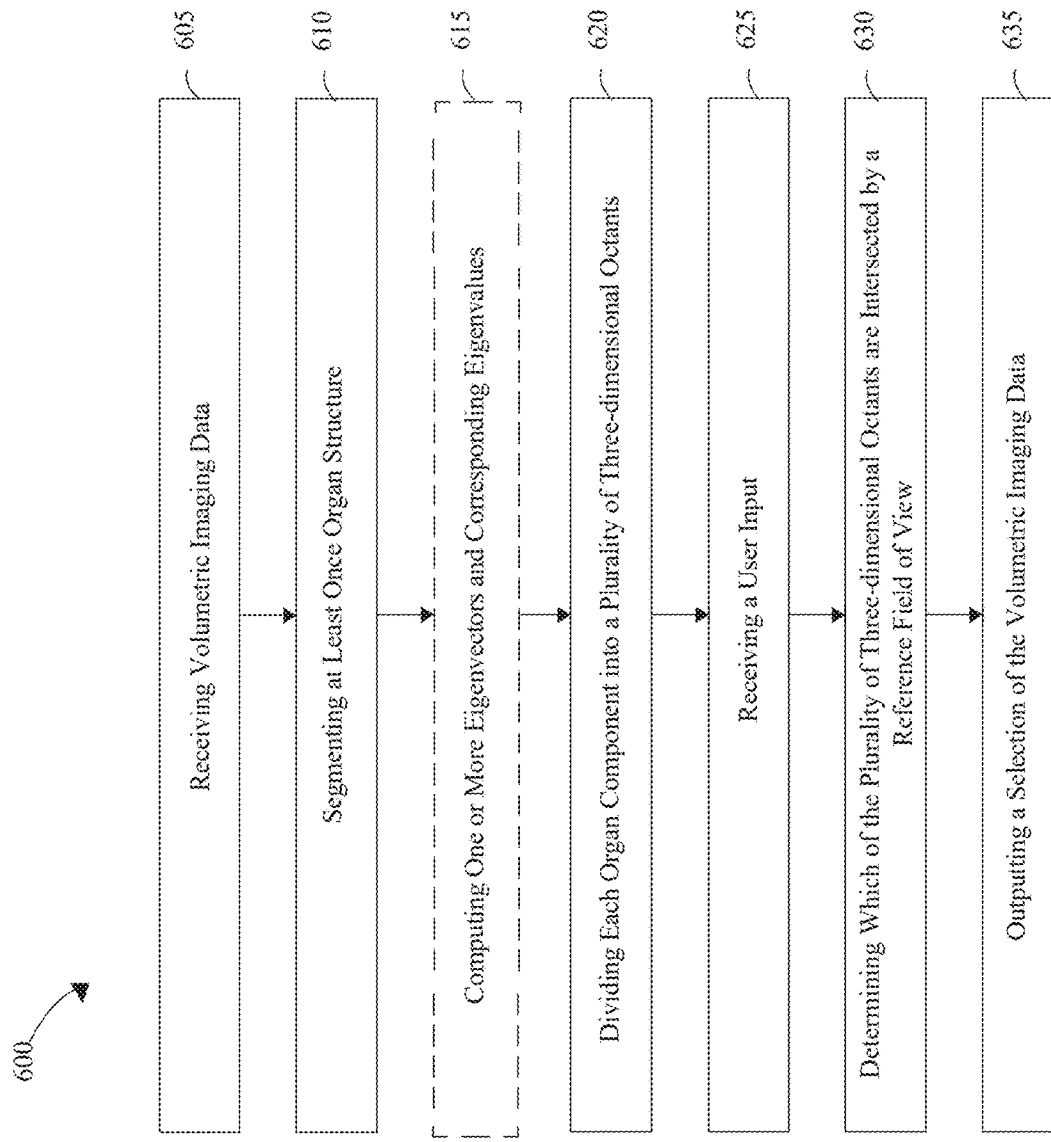
FIG. 6 illustrates a flow diagram of an exemplary method for generating canonical views for volumetric imaging data.

Referring now to FIG. 6, a flow diagram of an exemplary method 600 for generating canonical views for volumetric imaging data. Method 600 contains a step 605 of receiving, using at least a processor, volumetric imaging data representing at least one organ structure. In some embodiments, the volumetric imaging data may include a computed tomography (CT) scan. These may be implemented as reference to FIGS. 1-5.

With continued reference to FIG. 6, method 600 contains a step 610 of segmenting, using at least a processor, at least one organ structure of volumetric imaging data into a plurality of organ components. These may be implemented as reference to FIGS. 1-5.

With continued reference to FIG. 6, method 600 may contain a step 615 of computing, using at least a processor and for each organ component of a plurality of organ components, one or more eigenvectors and corresponding eigenvalues, wherein the one or more eigenvectors may define a component-specific spatial coordinate method. These may be implemented as reference to FIGS. 1-5.

With continued reference to FIG. 6, method 600 contains a step 620 of dividing, using at least a processor, each organ component into a plurality of three-dimensional octants as a function of one or more eigenvectors. In some embodiments, dividing each organ component into the plurality of three-dimensional octants may include computing, for each organ component of the plurality of organ components, one or more eigenvectors and corresponding eigenvalues based on a spatial distribution of voxels within the organ component. In some embodiments, dividing each organ component into the plurality of three-dimensional octants may include: constructing an affinity matrix from features extracted from the volumetric imaging data; computing the one or more eigenvectors of the affinity matrix; and dividing each organ component using the segmentation algorithm as a function of the one or more eigenvectors. In some embodiments, dividing each organ component into the plurality of three-dimensional octants may include dividing each organ component into the plurality of three-dimensional octants using planes that are orthogonal to the one or more eigenvectors of the component-specific spatial coordinate system. These may be implemented as reference to FIGS. 1-5.

With continued reference to FIG. 6, method 600 contains a step 625 of receiving, using at least a processor, a user input, wherein the user input includes a selection of a reference field of view from volumetric imaging data. In some embodiments, receiving the user input may include: receiving user feedback of the user input, wherein the user feedback is associated with the canonical view; and updating the canonical view stored in a database as a function of the user feedback, wherein updating the canonical view may include removing the canonical view from the database. This may be implemented as reference to FIGS. 1-5.

With continued reference to FIG. 6, method 600 contains a step 630 of determining, using at least a processor, which of a plurality of three-dimensional octants are intersected by a reference field of view, wherein determining which of the plurality of three-dimensional octants are intersected by the reference field of view includes storing a mapping of the intersected three-dimensional octants as a canonical view. In some embodiments, the canonical view may be rendered as a two-dimensional projection that aligns with the one or more eigenvectors. In some embodiments, storing the mapping of the intersected three-dimensional octants may include encoding the intersected three-dimensional octants as a set of indices associated with the component-specific spatial coordinate system. These may be implemented as reference to FIGS. 1-5.

With continued reference to FIG. 6, method 600 contains a step 635 of outputting, using at least a processor, a selection of volumetric imaging data as a function of a canonical view. In some embodiments, the canonical view may be rendered as a two-dimensional projection that aligns with the one or more eigenvectors. In some embodiments, outputting the selection of the volumetric imaging data as a function of the canonical view may include: receiving the user input defining the selection of the volumetric imaging data using a simulated ultrasound probe; and displaying the volumetric imaging data on a user interface as a function of the user input. In some embodiments, outputting the selection of the volumetric imaging data as a function of the canonical view may include: generating view training data, wherein the view training data may include exemplary volumetric imaging data paired with manually labeled canonical views; training a view machine-learning model using the view training data; inputting the volumetric imaging data into the view machine-learning model; and outputting the selection of the volumetric imaging data as a function of the canonical view using the trained view machine-learning model. These may be implemented as reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
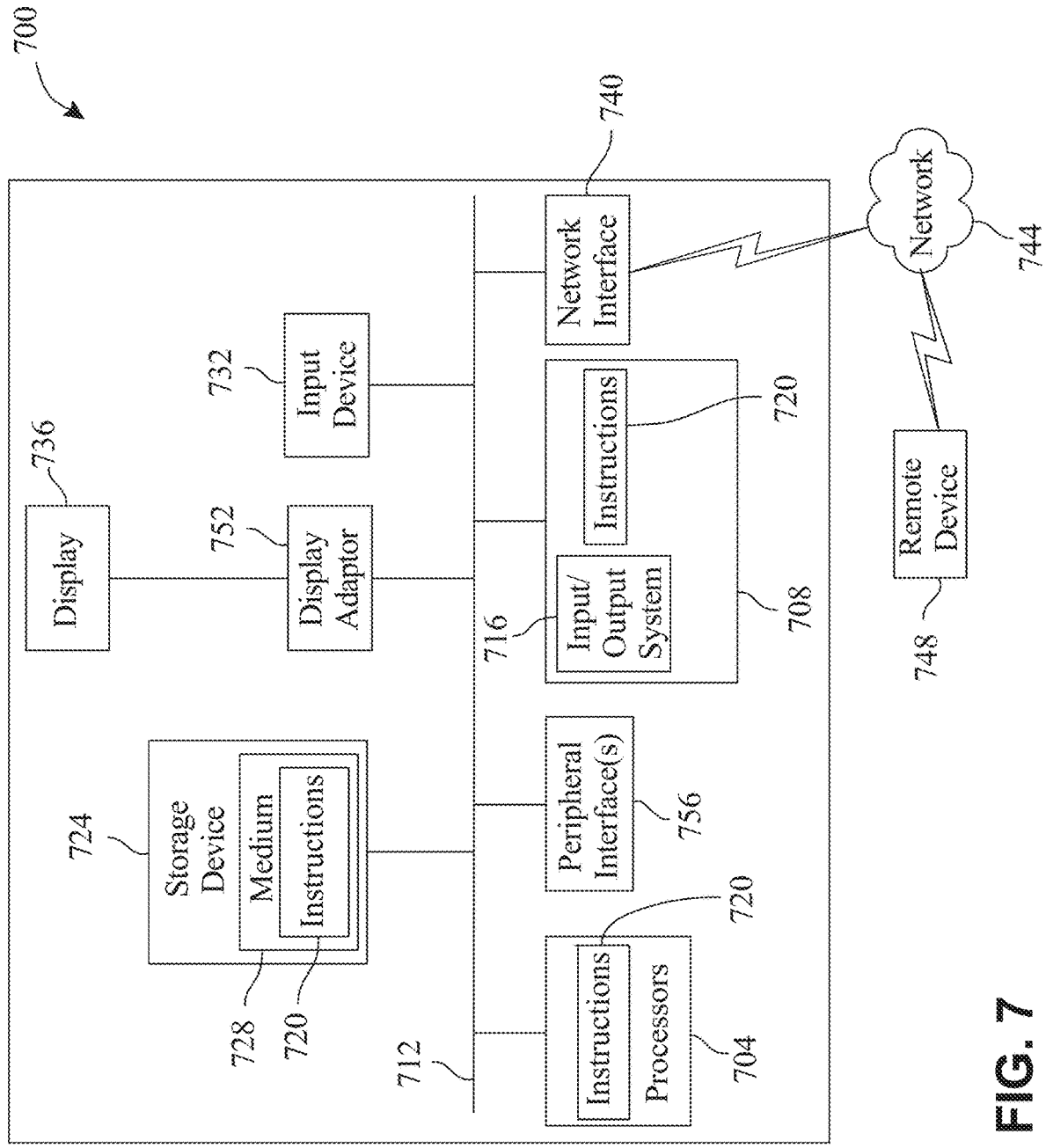
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and memory 708 that communicate with each other, and with other components, via a bus 712. Bus 712 may include any of several types of bus structures including, but not limited to, memory bus, memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating canonical views for volumetric imaging data, the system comprising:
   at least a processor; and
   a memory communicatively connected to the at least a processor, wherein the memory contains instructions configuring the at least a processor to:
   receive volumetric imaging data representing at least one organ structure;
   segment the at least one organ structure of the volumetric imaging data into a plurality of organ components;
   divide each organ component into a plurality of three-dimensional octants as a function of a segmentation algorithm;
   receive a user input, wherein the user input comprises a selection of a reference field of view from the volumetric imaging data;
   determine a subset of the plurality of three-dimensional octants which are intersected by the reference field of view, wherein determining which of the plurality of three-dimensional octants are intersected by the reference field of view comprises storing a mapping of the intersected three-dimensional octants as a canonical view; and
   output a selection of the volumetric imaging data as a function of the canonical view.

2. The system of claim 1, wherein the volumetric imaging data comprises a computed tomography (CT) scan.

3. The system of claim 1, wherein dividing each organ component into the plurality of three-dimensional octants comprises computing, for each organ component of the plurality of organ components, one or more eigenvectors and corresponding eigenvalues based on a spatial distribution of voxels within the organ component.

4. The system of claim 3, wherein dividing each organ component into the plurality of three-dimensional octants comprises:
   constructing an affinity matrix from features extracted from the volumetric imaging data;
   computing the one or more eigenvectors of the affinity matrix; and
   dividing each organ component using the segmentation algorithm as a function of the one or more eigenvectors.

5. The system of claim 3, wherein dividing each organ component into the plurality of three-dimensional octants comprises dividing each organ component into the plurality of three-dimensional octants using planes that are orthogonal to the one or more eigenvectors of the component-specific spatial coordinate system.

6. The system of claim 3, wherein the canonical view is rendered as a two-dimensional projection that aligns with the one or more eigenvectors.

7. The system of claim 1, wherein storing the mapping of the intersected three-dimensional octants comprises encoding the intersected three-dimensional octants as a set of indices associated with the component-specific spatial coordinate system.

8. The system of claim 1, wherein receiving the user input comprises:
   receiving user feedback of the user input, wherein the user feedback is associated with the canonical view; and
   updating the canonical view stored in a database as a function of the user feedback, wherein updating the canonical view comprises removing the canonical view from the database.

9. The system of claim 1, wherein outputting the selection of the volumetric imaging data as a function of the canonical view comprises:
   receiving the user input defining the selection of the volumetric imaging data using a simulated ultrasound probe; and
   displaying the volumetric imaging data on a user interface as a function of the user input.

10. The system of claim 1, wherein outputting the selection of the volumetric imaging data as a function of the canonical view comprises:
    generating view training data, wherein the view training data comprises exemplary volumetric imaging data paired with manually labeled canonical views;
    training a view machine-learning model using the view training data;
    inputting the volumetric imaging data into the view machine-learning model; and
    outputting the selection of the volumetric imaging data as a function of the canonical view using the trained view machine-learning model.

11. A method for generating canonical views for volumetric imaging data, the method comprising:

receiving, using at least a processor, volumetric imaging data representing at least one cardiac structure;

segmenting, using the at least a processor, the at least one organ structure of the volumetric imaging data into a plurality of organ components;

computing, using the at least a processor and for each organ component of the plurality of organ components, one or more eigenvectors and corresponding eigenvalues, wherein the one or more eigenvectors define a component-specific spatial coordinate method;

dividing, using the at least a processor, each organ component into a plurality of three-dimensional octants as a function of the one or more eigenvectors;

receiving, using the at least a processor, a user input, wherein the user input comprises a selection of a reference field of view from the volumetric imaging data;

determining, using the at least a processor, which of the plurality of three-dimensional octants are intersected by the reference field of view, wherein determining which of the plurality of three-dimensional octants are intersected by the reference field of view comprises storing a mapping of the intersected three-dimensional octants as a canonical view; and outputting, using the at least a processor, the volumetric imaging data with the canonical view.

12. The method of claim 11, wherein the volumetric imaging data comprises a computed tomography (CT) scan.

13. The method of claim 11, wherein dividing each organ component into the plurality of three-dimensional octants comprises computing, for each organ component of the plurality of organ components, one or more eigenvectors and corresponding eigenvalues based on a spatial distribution of voxels within the organ component.

14. The method of claim 13, wherein dividing each organ component into the plurality of three-dimensional octants comprises:

constructing an affinity matrix from features extracted from the volumetric imaging data;

computing the one or more eigenvectors of the affinity matrix; and dividing each organ component using the segmentation algorithm as a function of the one or more eigenvectors.

15. The method of claim 13, wherein dividing each organ component into the plurality of three-dimensional octants comprises dividing each organ component into the plurality of three-dimensional octants using planes that are orthogonal to the one or more eigenvectors of the component-specific spatial coordinate system.

16. The method of claim 13, wherein the canonical view is rendered as a two-dimensional projection that aligns with the one or more eigenvectors.

17. The method of claim 11, wherein storing the mapping of the intersected three-dimensional octants comprises encoding the intersected three-dimensional octants as a set of indices associated with the component-specific spatial coordinate system.

18. The method of claim 11, wherein receiving the user input comprises:

receiving user feedback of the user input, wherein the user feedback is associated with the canonical view; and updating the canonical view stored in a database as a function of the user feedback, wherein updating the canonical view comprises removing the canonical view from the database.

19. The method of claim 11, wherein outputting the selection of the volumetric imaging data as a function of the canonical view comprises:

receiving the user input defining the selection of the volumetric imaging data using a simulated ultrasound probe; and displaying the volumetric imaging data on a user interface as a function of the user input.

20. The method of claim 11, wherein outputting the selection of the volumetric imaging data as a function of the canonical view comprises:

generating view training data, wherein the view training data comprises exemplary volumetric imaging data paired with manually labeled canonical views;

training a view machine-learning model using the view training data;

inputting the volumetric imaging data into the view machine-learning model; and outputting the selection of the volumetric imaging data as a function of the canonical view using the trained view machine-learning model.

* * * * *